United States Patent
Thomas et al.

(10) Patent No.: US 10,429,150 B1
(45) Date of Patent: Oct. 1, 2019

(54) COMPACT OPTICAL SIGHT

(71) Applicant: KRUGER OPTICAL, INC., Portland, OR (US)

(72) Inventors: Mark A. Thomas, Portland, OR (US); Mitchell Thomas, Tigard, OR (US)

(73) Assignee: KRUGER OPTICAL, INC., Portland, OR (US)

( * ) Notice: Subject to any disclaimer, the term of this patent is extended or adjusted under 35 U.S.C. 154(b) by 0 days.

(21) Appl. No.: 16/266,287

(22) Filed: Feb. 4, 2019

(51) Int. Cl.
*F41G 1/027* (2006.01)
*G02B 27/09* (2006.01)
*F41G 1/38* (2006.01)

(52) U.S. Cl.
CPC ............... *F41G 1/027* (2013.01); *F41G 1/38* (2013.01); *G02B 27/0955* (2013.01); *G02B 27/0972* (2013.01)

(58) Field of Classification Search
CPC ....... F41G 1/027; F41G 1/38; G02B 27/0955; G02B 27/0972
USPC .......................................................... 42/111
See application file for complete search history.

(56) References Cited

U.S. PATENT DOCUMENTS

| | | | | |
|---|---|---|---|---|
| 9,164,269 B1* | 10/2015 | Jahromi | ................... | F41G 1/38 |
| 9,417,036 B2* | 8/2016 | Jung | ........................ | F41G 1/38 |
| 2001/0048552 A1* | 12/2001 | Koyama | ............. | G02B 15/177 |
| | | | | 359/431 |
| 2001/0055155 A1* | 12/2001 | Kanai | ................... | G02B 27/646 |
| | | | | 359/557 |
| 2012/0026384 A1* | 2/2012 | Yamada | ............. | G02B 13/0035 |
| | | | | 348/340 |
| 2012/0075696 A1* | 3/2012 | Jung | ........................ | F41G 1/38 |
| | | | | 359/401 |
| 2013/0044361 A1* | 2/2013 | Katakura | ........... | A61B 1/00183 |
| | | | | 359/226.1 |
| 2014/0096428 A1* | 4/2014 | Jeung | ....................... | F41G 1/30 |
| | | | | 42/113 |
| 2014/0198194 A1* | 7/2014 | Suga | .................... | G02B 23/243 |
| | | | | 348/65 |
| 2015/0168102 A1* | 6/2015 | Jeung | ....................... | F41G 1/30 |
| | | | | 42/130 |
| 2016/0018188 A1* | 1/2016 | Jahromi | ................... | F41G 1/38 |
| | | | | 359/428 |
| 2017/0038177 A1* | 2/2017 | Sun | .......................... | F41G 1/30 |
| 2017/0049306 A1* | 2/2017 | Katakura | ................. | A61B 1/04 |
| 2017/0068078 A1* | 3/2017 | Takakubo | .......... | G02B 13/0045 |
| 2017/0089668 A1* | 3/2017 | Jung | ......................... | F41G 1/38 |
| 2017/0329124 A1* | 11/2017 | Morita | ................... | G02B 13/04 |
| 2019/0121008 A1* | 4/2019 | Ogawa | ................... | G02B 23/26 |

* cited by examiner

*Primary Examiner* — Joshua E Freeman
(74) *Attorney, Agent, or Firm* — Timothy E. Siegel Patent Law, PLLC; Timothy E. Siegel

(57) ABSTRACT

An improvement to an optical assembly that is adapted to accept light from a field of view in front of the optical assembly and create a first inverted image on a first image plane. Further the assembly includes an objective lens, a first prism adapted to receive light from the objective lens and a second prism, adapted to receive light from the first prism and emit light. The improvement is the addition of a negative lens interposed between the first prism and the second prism, thereby reducing the total optical pathway of the optical assembly, relative to a device performing the same optical function and lacking the negative lens.

20 Claims, 6 Drawing Sheets

COMPACT OPTICAL SIGHT

BACKGROUND OF THE INVENTION

Background

The length of the mounting rail on top of a firearm can impose a limit on the number and types of devices, for example a night vision device and scope that can be mounted on the rail. To permit rail space for the mounting of other devices, prism scopes are typically used, as they are substantially shorter than traditional rifle scopes. A prism scope typically includes a pivot tube enclosing a pair of prisms, the first (in sequence of light travel) is termed a roof prism and the second of which is termed a delta prism, spaced apart by about 0.5 mm. A prism scope typically does not include a zoom mechanism to permit variable magnification but is set at a fixed level of magnification. Although currently available prism scopes yield rail space, relative to traditional scopes, prism scopes that are shorter still would be desirable.

SUMMARY OF INVENTION

The following embodiments and aspects thereof are described and illustrated in conjunction with systems, tools, and methods which are meant to be exemplary and illustrative, not limiting in scope. In various embodiments, one or more of the above-described problems have been reduced or eliminated, while other embodiments are directed to other improvements.

In a first separate aspect, the present invention may take the form of an improvement to an optical assembly that is adapted to accept light from a field of view in front of the optical assembly and create a first inverted image on a first image plane. Further the assembly includes an objective lens, a first prism adapted to receive light from the objective lens and a second prism, adapted to receive light from the first prism and emit light. The improvement is the addition of a negative lens interposed between the first prism and the second prism, thereby reducing the total optical pathway of the optical assembly, relative to a device performing the same optical function and lacking the negative lens.

In a second separate aspect, the present invention may take the form of an optical assembly having a frame, including a spacer defining an aperture and a first prism, seated on the spacer. Further, a second prism is seated on the spacer and separated from the first prism by the spacer. Finally, a negative lens seated in the aperture.

BRIEF DESCRIPTION OF DRAWINGS

Various embodiments of the invention are disclosed in the following detailed description and accompanying drawings.

DETAILED DESCRIPTION AND EMBODIMENTS

The following is a detailed description of exemplary embodiments to illustrate the principles of the invention. The embodiments are provided to illustrate aspects of the invention, but the invention is not limited to any embodiment. The scope of the invention encompasses numerous alternatives, modifications and equivalent; it is limited only by the claims.

Numerous specific details are set forth in the following description in order to provide a thorough understanding of the invention. However, the invention may be practiced according to the claims without some or all of these specific details. For the purpose of clarity, technical material that is known in the technical fields related to the invention has not been described in detail so that the invention is not unnecessarily obscured.

Figure 1:
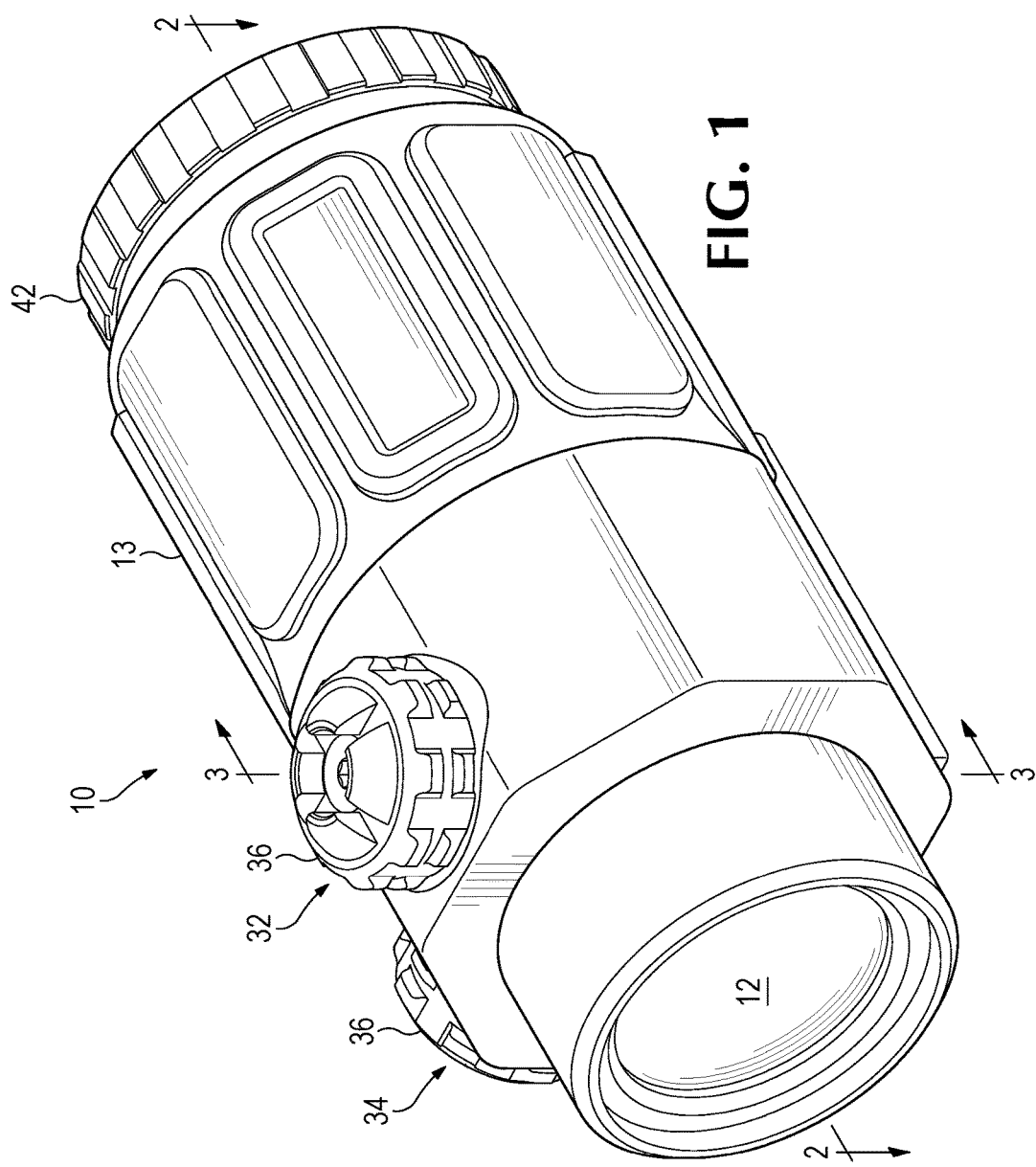
FIG. 1 is a front-top isometric view of a scope, according to the present invention.
Figure 2:
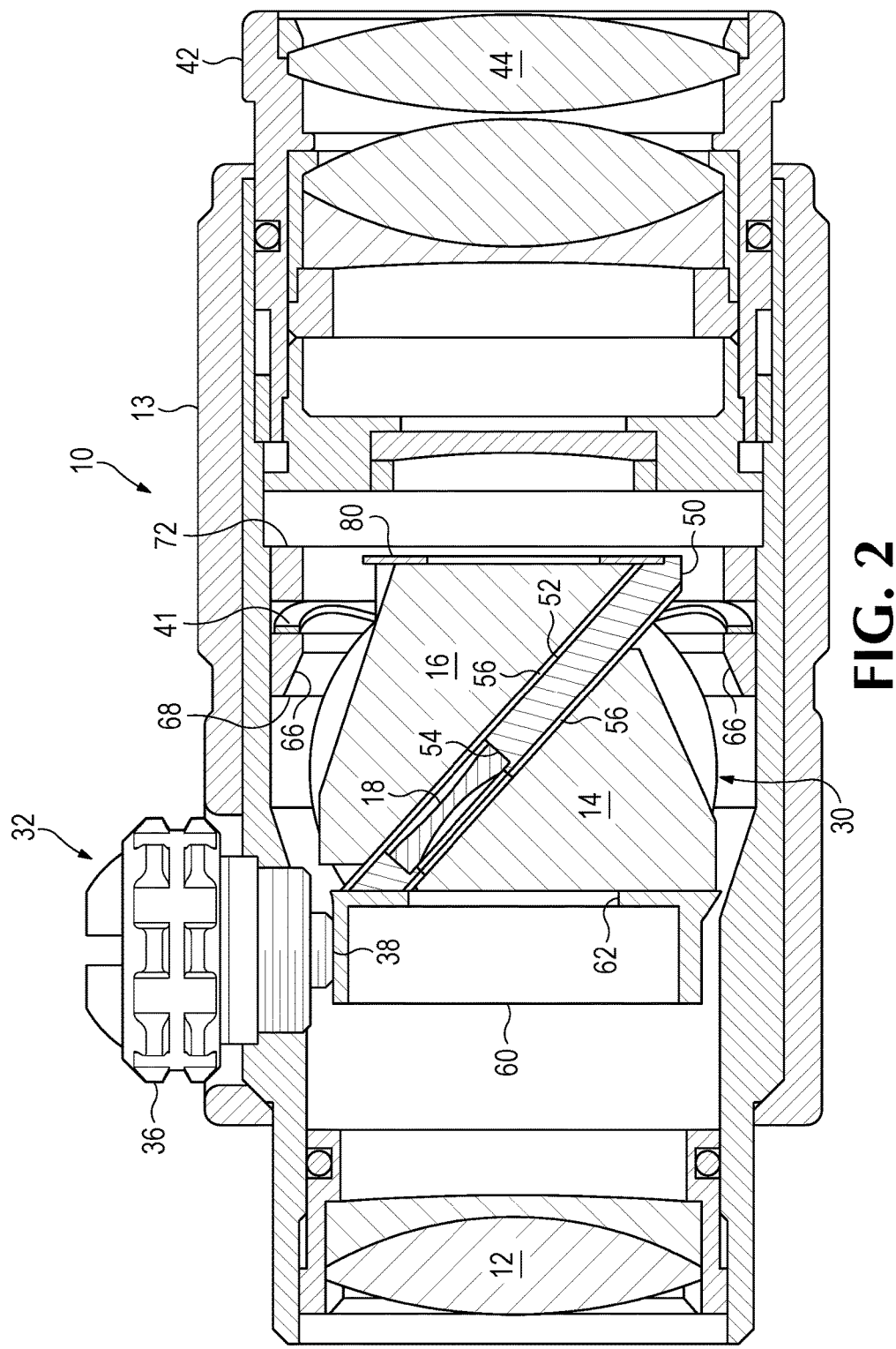
FIG. 2 is a sectional view of the scope of FIG. 1, taken along line 2-2 of FIG. 1
Figure 4:
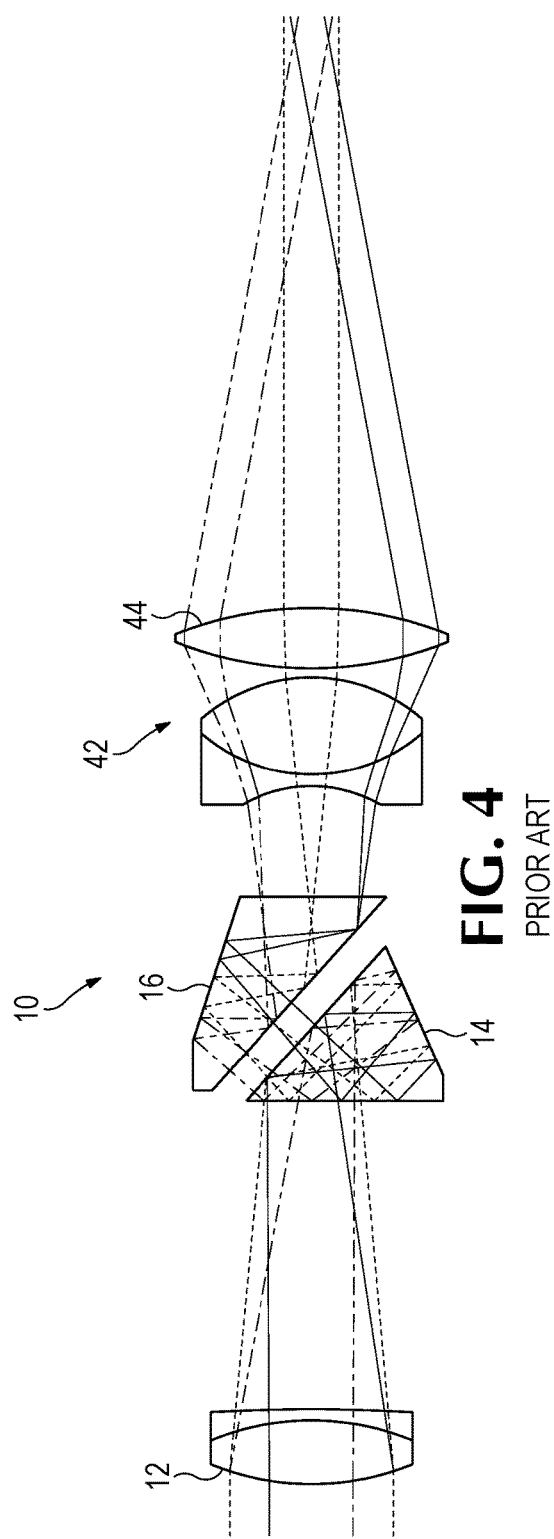
FIG. 4 is a ray trace diagram of a prior art optical train, having an objective lens, a pair of roof prisms and eyepiece lenses/
Figure 5:
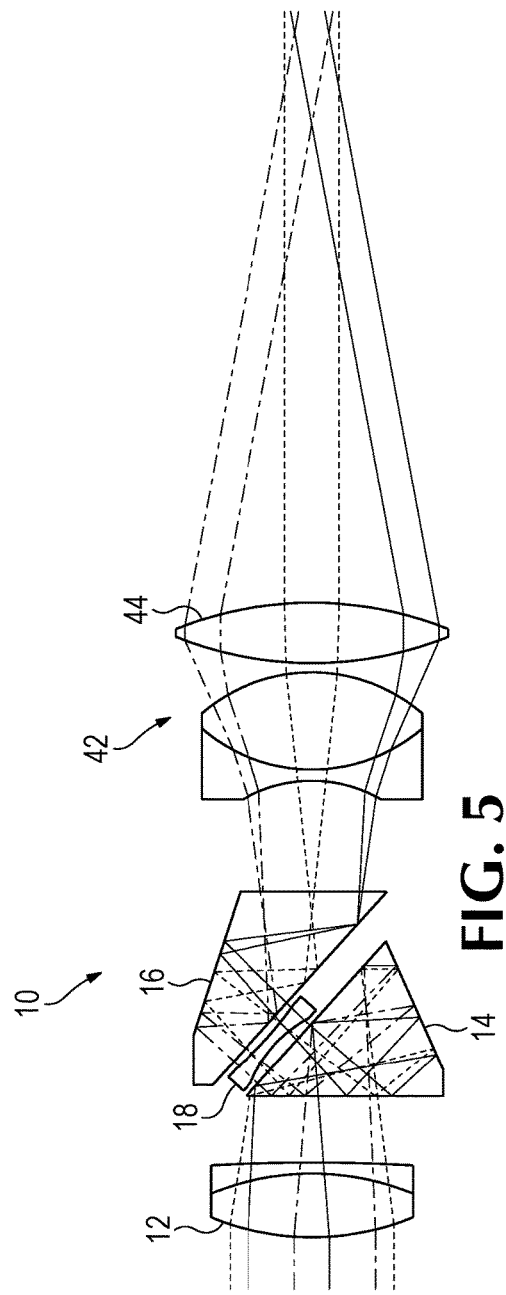
FIG. 5 is a ray trace diagram of an optical train, like that of FIG. 4, but with a negative lens interposed between the pair of roof prisms.

Referring to FIG. 1 a short prism scope 10 includes an objective lens 12, held in place at the front of a housing 13, and accepting light and refracting it into a roof prism 14. Referring, now, to FIG. 2, a delta prism 16 is spaced apart from roof prism 14 and a Barlowe lens 18 is interposed between the roof prism 14 and delta prism 16. Referring to FIGS. 4 and 5, the presence of delta prism 16, permits objective lens 12 to be brought closer to the front surface of roof prism 14, and thereby reducing the total optical pathway of scope 10, while still forming an image plane at the back of delta prism 16.

Figure 3:
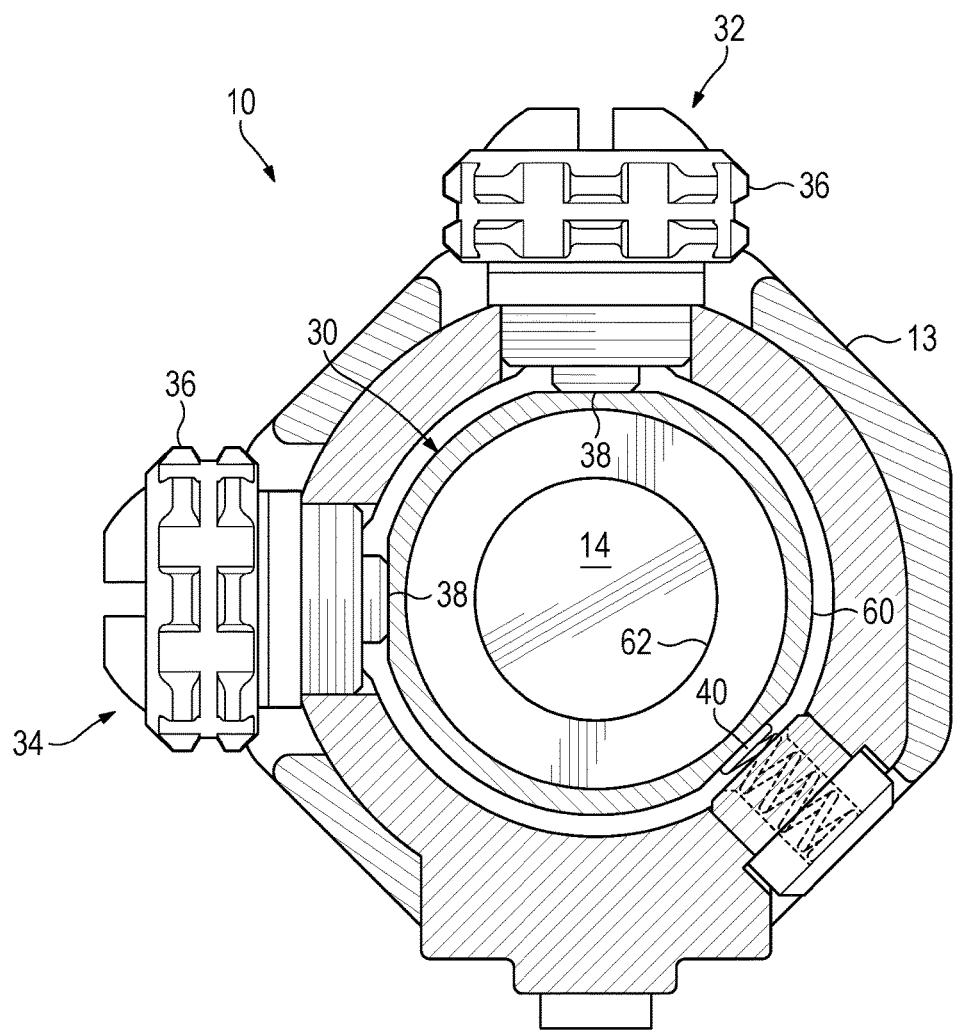
FIG. 3 is a sectional view of the scope of FIG. 1, taken along line 3-3 of FIG. 1.

Referring to FIG. 3, the assembly of prism 14, prism 16 and lens 18 is held in a pivot tube 30 that can be orientation-adjusted by action of orientation adjust assembly 32, or windage adjust assembly 34, each having a knob 36, the rotation of which in a first direction causes a post 38 to push against tube 30, changing its orientation. If either knob 36 is rotated in a second direction, opposite to the first direction, then spring 40 pushes tube 30 to a new orientation as a post 38 is withdrawn. A wave spring 41 permits pivot tube 30 to pivot, as it is pushed by a post 38 or spring 40. An eyepiece 42 focuses light from pivot tube 30 to present an image to a view looking through a rearmost lens 44.

Figure 6:
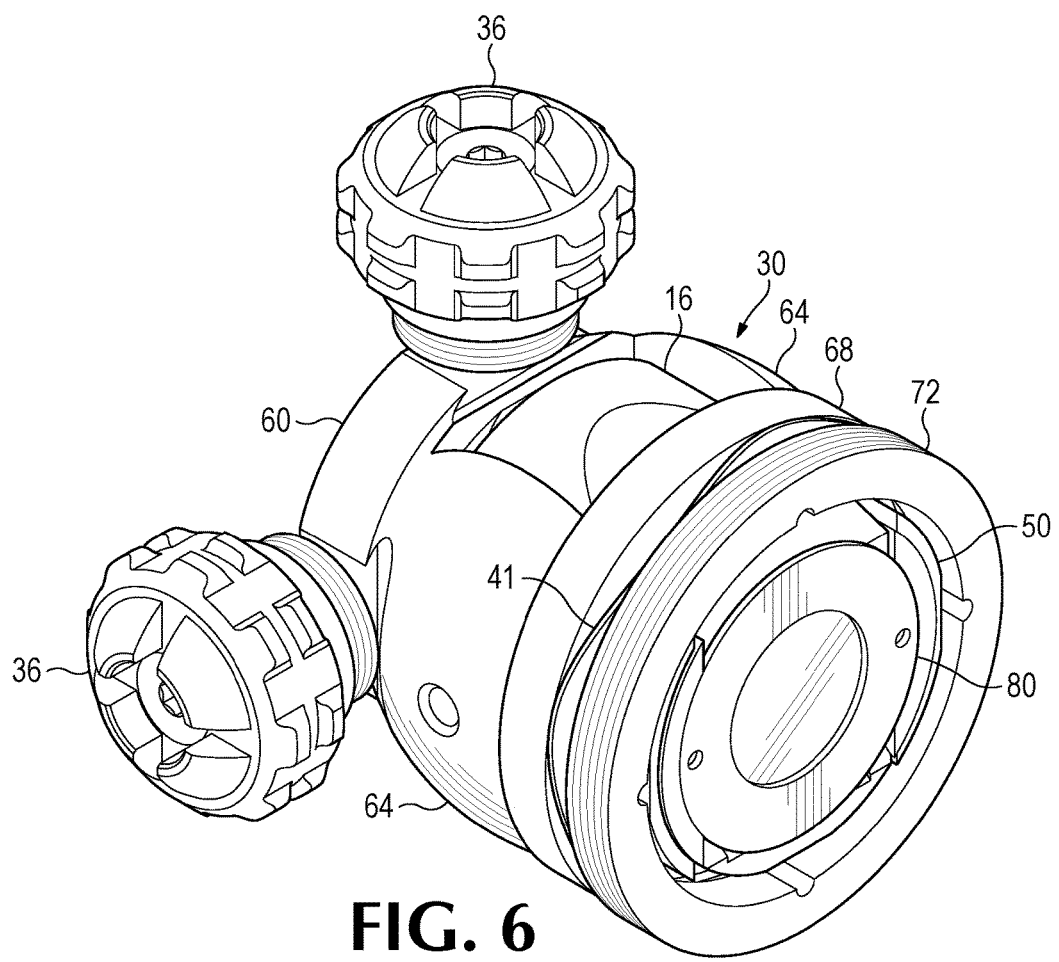
FIG. 6 is an isometric view of the pivot tube of the embodiment of FIG. 1.
Figure 7:
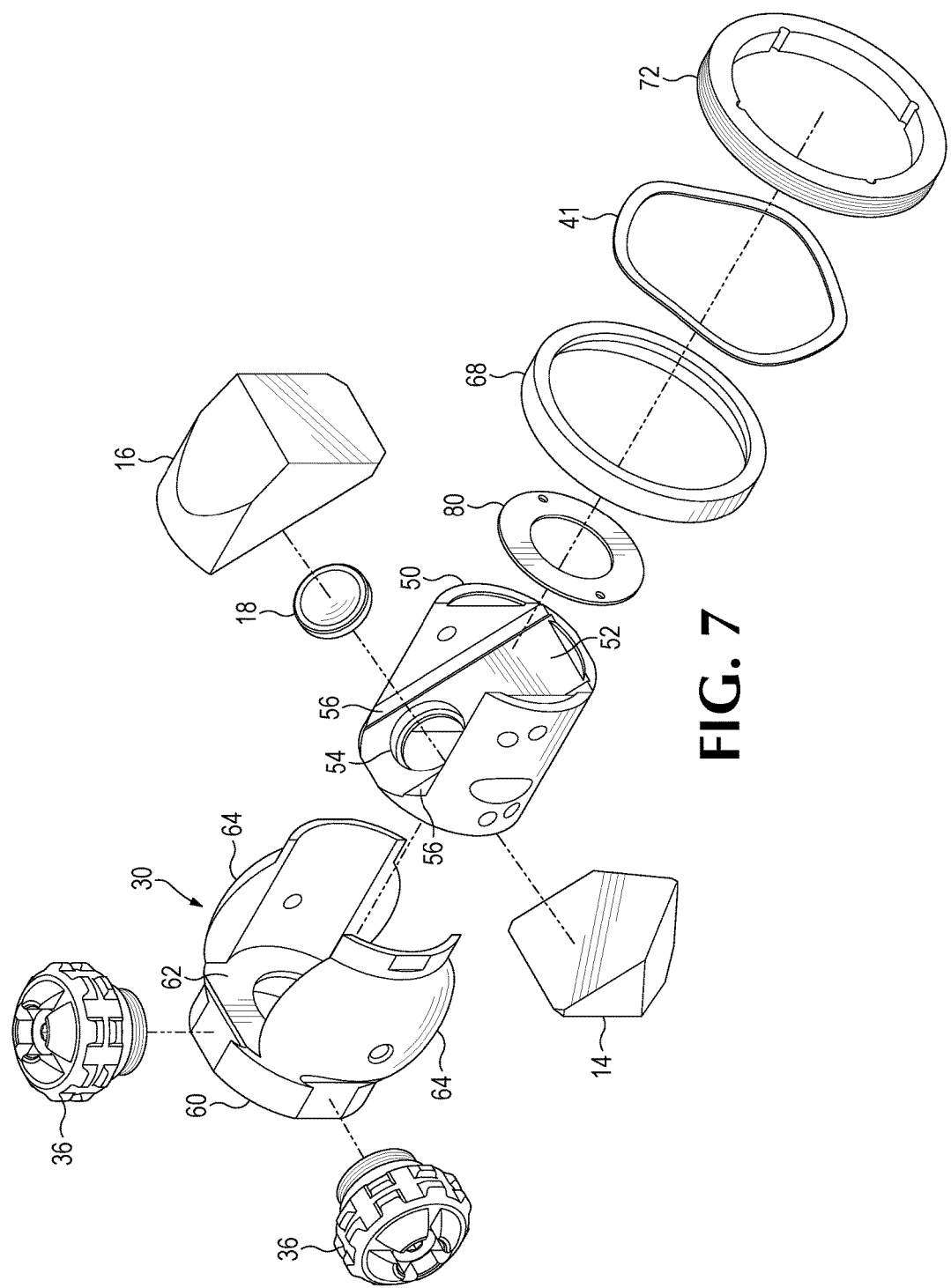
FIG. 7 is an exploded view of the pivot tube and contents, shown in FIG. 6.

Referring to FIG. 7, optical elements 14, 16, and 18 are held together (and spaced apart by a frame 50, which includes a spacer 52, which provides a seat for each of prisms 14 and 16. An aperture 54 in spacer 52, provides a seat for lens 18. Side rails 56, lift prism 16 away from the surface of spacer 52, thereby improving reflection quality. Referring, now, also to FIG. 6, frame 50 fits into pivot tube 30, which also includes a forward rim 60, which provides surfaces against which posts 38 and spring 40 push. An annular light block 62, accepts a round light beam (not shown) into prism 14, in which the light beam undergoes a sequence of reflections, leading to lens 18 and from there prism 16. Tube 30 also has rounded surfaces 64, which engage with a chamfer 66 in tube seat-ring 68, thereby permitting tube 30 to swivel against chamfer 66, as it is pushed by posts 38. Spring 41 is interposed between the tube seat-ring 68 and a rear ring 72, which is fixed within housing 13, in one embodiment by being threaded into place. Spring 41 accepts the impact of recoil, thereby cushioning elements 14, 16 and 18, and also pushes ring 68 into physical engagement with surfaces 64. A rear annular light block 80, is fixed to the rear surfaces of tube 30.

The scope described herein is of particular utility when it is desired to pair a scope with a night vision device on the railing of a firearm, particularly for a handgun, where rail space is quite limited. For a 3x scope, a length of 76.35 mm is achieved, representing a saving in length of a little less than an inch, compared with existing comparable prism scopes.

The disclosed embodiments are illustrative, not restrictive. While specific configurations of the scope have been described, it is understood that the present invention can be applied to a wide variety of optical technology. There are many alternative ways of implementing the invention.

What is claimed is:

1. An optical assembly, adapted to accept light from a field of view in front of said optical assembly and create a first inverted image on a first image plane, comprising an objective lens, a first prism adapted to receive light from said objective lens, a second prism, adapted to receive light from said first prism and emit light, and a negative lens interposed between said first prism and said second prism, thereby reducing the total optical pathway of the optical assembly, relative to a device performing the same optical function and lacking said negative lens.

2. The optical assembly of claim 1, wherein said optical assembly is a rifle scope having a front and a rear, and further includes:
    a) a scope housing, and wherein said objective lens is mounted at the front of said scope housing;
    b) an erector tube pivotably mounted in said scope housing and, holding said first prism, said negative lens, and said second prism;
    c) a user accessible actuation assembly for shifting the angle of said erector tube, relative to said scope housing; and
    d) an eyepiece mounted in the rear of said scope housing.

3. The optical assembly of claim 2, wherein said actuation assembly includes an elevation adjust assembly, comprising an actuator and a moveable post that is lowered to press downwardly against said erector tube and raised to permit said tube housing to rise, by movement of said actuator, and a spring, urging said erector tube upwardly.

4. The optical assembly of claim 2, wherein said actuation assembly includes a windage adjust assembly, comprising an actuator and a moveable post that is moved horizontally in a first direction to move said erector tube in said first direction and retracted horizontally to permit said tube housing to move in a direction opposite said first direction, by movement of said actuator, and a spring, urging said erector tube in said second direction.

5. The optical assembly of claim 1, wherein said first prism has a light emitting surface and said second prism has a light receiving surface that is parallel to said light emitting surface, and wherein said negative lens covers only a portion of the area of said light emitting surface and wherein light received by said first prism from said objective lens is reflected by surfaces of said first prism to pass through said negative lens.

6. The optical assembly of claim 1, wherein said first prism, said second prism and said negative lens are held together by a frame that includes a spacer interposed between said first prism and said second prism thereby defining a seat for said first prism, and a seat for said second prism, said spacer further defining an aperture into which said negative lens is seated.

7. The optical assembly of claim 6, wherein said spacer includes raised side areas, so that a portion of a surface of said first prism, facing said spacer, and a portion of a surface of said second prism, facing said spacer, do not abut said spacer.

8. The optical assembly of claim 1, wherein said optical assembly forms a part of a larger optical assembly.

9. The optical assembly of claim 1, wherein said objective lens has a rear surface and said first prism has a front surface and wherein said rear surface of said objective lens is less than 20 mm from said front surface of said first prism.

10. The optical assembly of claim 1, wherein said second prism is spaced apart from said first prism by more than 1.5 mm.

11. The optical assembly of claim 1, wherein said second prism is spaced apart from said first prism by more than 2 mm.

12. The optical assembly of claim 1, wherein said second prism is spaced apart from said first prism by more than 2.5 mm.

13. The optical assembly of claim 1, wherein said negative lens is a Barlow lens.

14. The optical assembly of claim 1, wherein said first prism is a roof prism.

15. The optical assembly of claim 1, wherein said second prism is a delta prism.

16. An optical assembly, comprising:
    a) a frame, including a spacer defining an aperture;
    b) a first prism, seated on said spacer;
    c) a second prism, seated on said spacer and separated from said first prism by said spacer; and
    d) a negative lens seated in said aperture.

17. The optical assembly of claim 16, wherein said spacer includes raised side-rails so that portions of a surface of said first prism, facing said spacer, are held away from said spacer, by said raised areas and portions of a surface of said second prism, facing said prism, are held away from said spacer by said raised areas.

18. The optical assembly of claim 16, further including an exterior housing having a first opening to permit light to enter and be received by said first prism and a second opening to permit light emitted from said second prism to exit.

19. The optical assembly of claim 16, further being a rifle scope, having a housing, supporting said frame, an objective lens for accepting light from a field of view, and an eyepiece, for presenting an image of said field of view to a user.

20. The optical assembly of claim 19, further wherein said housing supports said frame in a manner that permits said frame to pivot within said housing, and further including an actuation assembly, permitting a user to pivot said frame, relative to said housing.

* * * * *